US009579951B2

(12) United States Patent
Tschismar

(10) Patent No.: US 9,579,951 B2
(45) Date of Patent: Feb. 28, 2017

(54) AIR CONDITIONING DEVICE AND METHOD FOR AIR CONDITIONING AN INTERIOR AND/OR AT LEAST ONE COMPONENT OF AN ELECTRIC VEHICLE

(75) Inventor: Oliver Tschismar, Metzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 930 days.

(21) Appl. No.: 13/877,971

(22) PCT Filed: Aug. 30, 2011

(86) PCT No.: PCT/EP2011/064866
§ 371 (c)(1),
(2), (4) Date: Jan. 7, 2014

(87) PCT Pub. No.: WO2012/045528
PCT Pub. Date: Apr. 12, 2012

(65) Prior Publication Data

US 2013/0240175 A1 Sep. 19, 2013

(30) Foreign Application Priority Data

Oct. 8, 2010 (DE) ........................ 10 2010 042 195

(51) Int. Cl.
*B60H 1/00* (2006.01)
*B60H 1/14* (2006.01)

(52) U.S. Cl.
CPC ......... *B60H 1/143* (2013.01); *B60H 1/00278* (2013.01); *B60H 1/00885* (2013.01);
(Continued)

(58) Field of Classification Search
CPC ............ B60H 1/00271; B60H 1/00278; B60H 1/00885; B60H 1/143; F25B 25/00; F25B 25/005; F25B 5/00; F25B 5/02
See application file for complete search history.

(56) References Cited

U.S. PATENT DOCUMENTS 6,370,903 B1 * 4/2002 Wlech ................ B60H 1/00385 165/104.12
6,862,892 B1 * 3/2005 Meyer ................ B60H 1/00878 165/42

(Continued)

FOREIGN PATENT DOCUMENTS

DE 196 09 048 9/1997
JP 2008-296646 12/2008

(Continued)

OTHER PUBLICATIONS

International Search Report for PCT/EP2011/064866, dated Dec. 13, 2011.

*Primary Examiner* — Ryan J Walters
*Assistant Examiner* — Antonio R Febles
(74) *Attorney, Agent, or Firm* — Gerard Messina

(57) ABSTRACT

An air conditioning device for air conditioning an interior and/or a component of an electric vehicle includes multiple fluid circuits having respective working media and configured for heating and cooling the electric vehicle. A first fluid circuit is designed for heating the interior of the electric vehicle via the first heat exchanger. A second fluid circuit is designed for heating the first evaporator. A third fluid circuit is designed for heating or cooling the interior of the electric vehicle. A fourth fluid circuit is designed for heating the interior of the electric vehicle via the first heat exchanger. A fifth fluid circuit is designed for cooling the heat source of the component of the electric vehicle.

10 Claims, 5 Drawing Sheets

(52) U.S. Cl.
CPC .............. *B60H 2001/00928* (2013.01); *B60H 2001/00949* (2013.01)

(56) References Cited

U.S. PATENT DOCUMENTS

| | | | | |
|---|---|---|---|---|
| 6,895,773 | B2 * | 5/2005 | Amaral .............. | B60H 1/00464 62/244 |
| 2003/0010488 | A1 * | 1/2003 | Watanabe .......... | B60H 1/00335 165/202 |
| 2003/0233840 | A1 | 12/2003 | Choi | |
| 2008/0028768 | A1 | 2/2008 | Goenka | |
| 2008/0271937 | A1 | 11/2008 | King et al. | |
| 2009/0260377 | A1 | 10/2009 | Miller et al. | |
| 2013/0000344 | A1 * | 1/2013 | Ma .......................... | F25B 41/00 62/333 |

FOREIGN PATENT DOCUMENTS

| | | | |
|---|---|---|---|
| JP | 2009-120022 | 6/2009 | |
| WO | WO 2010094227 A1 * | 8/2010 | .............. F25B 41/00 |

* cited by examiner 1
2
3
10
11
12
21
22
23
31
32
33
34
35
36
37
41
42
43
51
61
62
63
71
72
81
82
83
84
85

1
2
3
10
11
20
21
22
23
31
32
33
34
35
36
37
41
42
43
44
51
61
62
63
71
72

1
2
3
10
11
12
21
22
23
31
32
33
34
35
36
37
41
42
43
51
61
62
63
71
72
81

1
2
3
10
11
12
21
22
23
31
32
33
34
35
36
37
41
42
43
51
61
62
63
71
72
83
83
83
83
85
85
85

AIR CONDITIONING DEVICE AND METHOD FOR AIR CONDITIONING AN INTERIOR AND/OR AT LEAST ONE COMPONENT OF AN ELECTRIC VEHICLE

BACKGROUND OF THE INVENTION

1. Field of the Invention

The present invention relates to an air conditioning device and a method for air conditioning an interior and/or at least one component of an electric vehicle.

2. Description of the Related Art

Published German patent document DE 196 09 048 C2 describes a heating and air conditioning device for motor vehicles, the described heating and air conditioning device having a first fluid circuit, which includes a heat exchanger, a pump, and a heat source for heating the fluid, the secondary side of the heat exchanger being acted on by air, and a blower being provided for generating an air flow. Furthermore, the described heating and air conditioning device includes a cooling circuit having an evaporator, a condenser, and a compressor, and a control unit for regulating the cooling circuit as a function of at least one signal of a temperature sensor, and of a settable setpoint value. The described heating and air conditioning device furthermore includes a second fluid circuit, which may be switched to the first fluid circuit via a valve means, having a heat accumulator situated therein and a pump, a heat source in the first fluid circuit being a heating device which is independent of the operation of the vehicle and is used for heating the air flowing through the heat exchanger and/or for charging the heat accumulator with thermal energy; the evaporator of the cooling circuit may be thermally coupled to the heat exchanger with the aid of the second fluid circuit and is used for charging the heat accumulator with cooling energy.

BRIEF SUMMARY OF THE INVENTION

It is therefore an object of the present invention to provide an air conditioning device and a method for air conditioning an interior and/or at least one component of an electric vehicle, which is usable in a flexible manner and may be easily adapted to different requirements.

Thus, according to the present invention, an air conditioning device and a method for air conditioning an interior and/or at least one component of an electric vehicle is provided, the air conditioning device having multiple fluid circuits and their respective working media and being designed for heating and cooling the electric vehicle, a first fluid circuit being switchable to circulate from a first pump via a heat source, further via a four-way valve and via a first heat exchanger, further via a third heat exchanger and via a first three-way valve back again to the first pump and being designed for heating the interior of the electric vehicle via the first heat exchanger. A second fluid circuit is switchable to circulate from the first pump via the heat source further via the four-way valve and a second heat exchanger having a first evaporator back again to the first motor-driven pump and is designed for heating the first evaporator. A third fluid circuit is switchable to circulate from the first evaporator of the second heat exchanger via an internal heat exchanger, further via a compressor and a second pump, via a third heat exchanger having a second evaporator, via a spring-loaded check valve, further via the internal heat exchanger and a first throttle, further via a second three-way valve in a first position back again to the second heat exchanger and is designed for heating the third heat exchanger, the third fluid circuit, having a second three-way valve in a second position and having an open through valve, including a fifth heat exchanger instead of the spring-loaded check valve and a fourth heat exchanger instead of the second heat exchanger, and being designed for cooling the interior of the electric vehicle via the fourth heat exchanger. A fourth fluid circuit may be switched on to circulate from the third heat exchanger via the first three-way valve and a third pump to the first heat exchanger back to the third heat exchanger and is designed for heating the interior of the electric vehicle via the first heat exchanger by using the heat received from the third fluid circuit via the third heat exchanger; a fifth fluid circuit may be switched on to circulate from the first motor-driven pump, via the heat source further to the four-way valve and a sixth heat exchanger further via the second heat exchanger and back again to the first motor-driven pump, and is designed for cooling the heat source of the at least one component of the electric vehicle.

The idea of the present invention is to achieve optimum air conditioning of the electric vehicle via the effective use of the heat source available in the electric vehicle by providing the air conditioning device with fluid circuits usable in an adaptable manner.

The advantages of the present invention are an efficient operation of the air conditioning device due to use of waste heat from components of the electric vehicle and/or use of thermal masses as heat sources. Due to the air conditioning device, even a heat source which has a low temperature level compared to the needed temperature level may be used. Furthermore, icing of the air conditioning device is avoided, since the waste heat from components of the electric vehicle and/or from thermal masses is used. In addition, the components of the air conditioning device are subjected to a light load, since the heat exchangers of the air conditioning device operate at relatively low operating temperatures and thus no thermal loads act on the heat exchangers and the air conditioning device, and the air conditioning device has no high-pressure zone of a fluid circuit operated using coolants.

According to one preferred refinement, the heat source of the air conditioning device has a thermal mass of an electric motor, of a power electronic system, and/or of a traction battery of the electric vehicle.

According to another preferred refinement, the first and/or the second, and/or the third, and/or the fourth fluid circuit(s) of the air conditioning device is/are designed as a coolant circuit having a coolant circulating in the circuit as a working medium, an appropriate pump being provided for circulating the working medium.

According to another preferred refinement, the second heat exchanger and/or the third heat exchanger, and/or the internal heat exchanger of the air conditioning device are designed as cross-counterflow heat exchangers.

According to another preferred refinement, the first and/or the fourth heat exchanger(s), and/or the fifth heat exchanger and/or the sixth heat exchanger of the air conditioning device is/are designed as active heat exchangers having an additionally installed blower.

According to another preferred refinement, the at least one component to be air conditioned of the electric vehicle includes an electrical energy accumulator of the electric vehicle to be operated in a preferred temperature range.

According to another preferred refinement, the third fluid circuit of the air conditioning device has another second throttle in order to supply the second heat exchanger and the fourth heat exchanger with working media having different operating pressures, whereby simultaneous heating and/or cooling, and dehumidifying of the interior of the electric vehicle is achievable.

According to another preferred refinement, thermal masses of a vehicle body, of a chassis, or of an undercarriage of the electric vehicle, having lower temperatures, are provided as heat sources of the air conditioning device, whereby even the air flowing around the electric vehicle may indirectly be used as a heat source.

According to one preferred refinement, the third fluid circuit is operated in the method as a coolant circuit using carbon dioxide, and particularly preferably using the coolant R744.

DETAILED DESCRIPTION OF THE INVENTION

Figure 1:
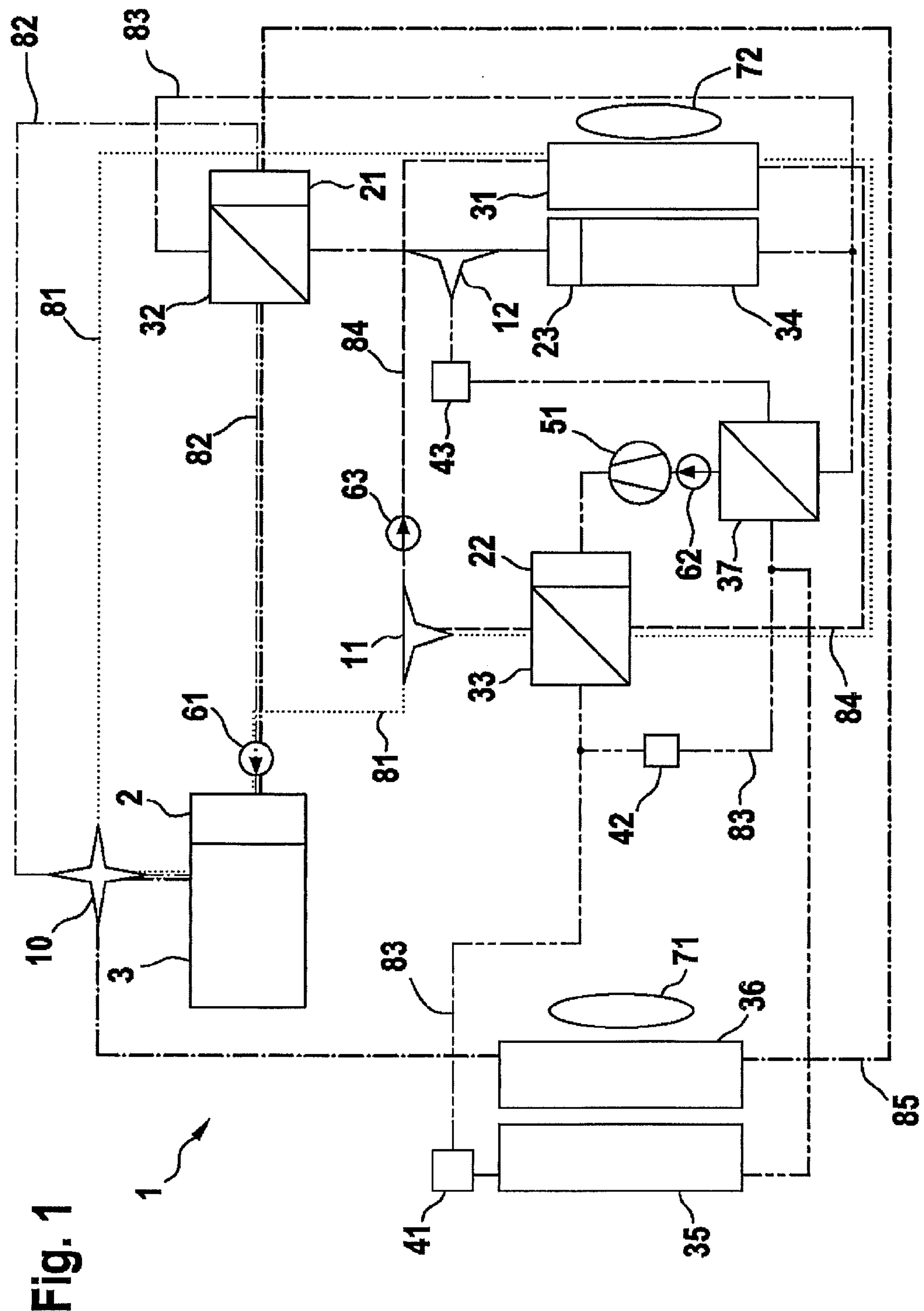
FIG. 1 schematically shows the structure of the air conditioning device according to one specific embodiment of the present invention.

In the figures, the same reference numerals identify the same components or components having an identical function.

FIG. 1 schematically shows the structure of air conditioning device 1 according to a specific embodiment of the present invention. Air conditioning device 1 includes, for example, a power electronic system 2 having an electric motor 3 as the heat source; other thermal masses of the electric vehicle may also be used as the heat source, such as a battery. A four-way valve 10 and a first three-way valve 11, as well as a second three-way valve 12 are used for controlling the working media through the particular fluid circuits 81 through 85. A first fluid circuit 81 extends from a first pump 61, via a heat source 2, 3 further via four-way valve 10, which is in a first of the two possible positions, and via a first heat exchanger 31, further via a third heat exchanger 33 and via first three-way valve 11 back again to first pump 61. A second fluid circuit 82 preferably extends from first pump 61 via heat source 2, 3 further via four-way valve 10 and a second heat exchanger 32 having a first evaporator 21 back again to first motor-driven pump 61. A third fluid circuit 83 extends from first evaporator 21 of second heat exchanger 32 via an internal heat exchanger 37, further via a compressor 51 and a second pump 62, via a third heat exchanger 33 having a second evaporator 22, via a spring-loaded check valve 42, further via internal heat exchanger 37 and a first throttle 43, further via a second three-way valve 12 in a first position, back again to second heat exchanger 32. Third fluid circuit 83 further includes a fifth heat exchanger 35, having a second three-way valve 12 in a second position and an open through valve 41, instead of spring-loaded check valve 42, and a fourth heat exchanger 34 having a third evaporator 23 instead of second heat exchanger 32. Due to the second position of second three-way valve 12, the third cooling circuit is able to cool the interior of the electric vehicle via fourth heat exchanger 34; the cooling effect may be enhanced by a second blower 72, which is installed on fourth heat exchanger 34 and/or on first heat exchanger 31. A fourth fluid circuit 84 extends from third heat exchanger 33 via first three-way valve 11 and a third pump 63 to first heat exchanger 31 back to third heat exchanger 33. Fourth fluid circuit 84 is used for heating the interior of the electric vehicle via first heat exchanger 31, blower 72 installed on first heat exchanger 31 being preferably operated for accelerating the heat transport from first heat exchanger 31 into the interior of the electric vehicle. A fifth fluid circuit 85 extends from first pump 61, via heat source 2, 3, further via four-way valve 10 and a sixth heat exchanger 36 equipped with a first blower 71, further via second heat exchanger 32 and back again to first motor-driven pump 61. Fifth fluid circuit 85 is provided for cooling components of the electric vehicle, such as electrical energy accumulators, electric motors, or other heat-emitting components of the electric vehicle such as a power electronic system.

Figure 2:
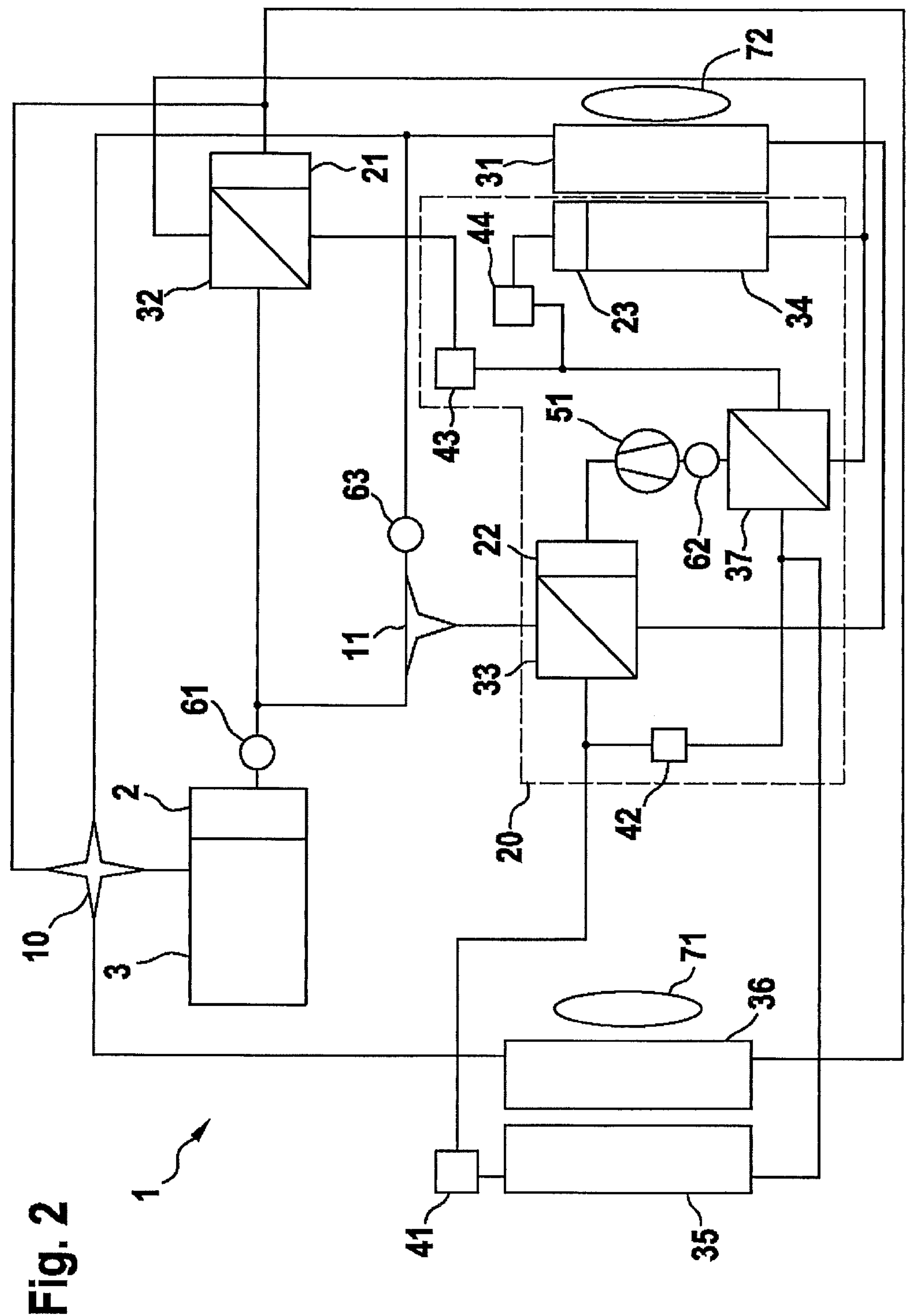
FIG. 2 schematically shows the structure of the air conditioning device having two expansion bodies according to another specific embodiment of the present invention.

FIG. 2 schematically shows the structure of the air conditioning device having two expansion bodies according to another specific embodiment of the present invention. FIG. 2 shows essentially the same components using the same reference numerals as in FIG. 1; FIG. 2 also shows that the specific embodiment shown of the air conditioning device having two expansion bodies makes it possible to make another function available, namely dehumidifying and simultaneous heating or cooling. The use of two expansion bodies or throttles 43, 44 allows, in particular, the air introduced into the interior of the electric vehicle to be dehumidified. Since, using first throttle 43 and second throttle 44 of heat pump device 20 according to the structure of air conditioning device 1, two different temperature values may be set on first heat exchanger 31 and fourth heat exchanger 34 by first heat exchanger 31 and fourth heat exchanger 34, in the event of a low temperature value at first heat exchanger 31 compared to the temperature values of fourth heat exchanger 34, the air moisture of the incoming air may be condensed at first heat exchanger 31; the air introduced into the interior of the electric vehicle may be brought to a lower value of a relative air humidity than would be the case when using a single heat exchanger for controlling the temperature of the air introduced into the interior of the electric vehicle.

Figure 3:
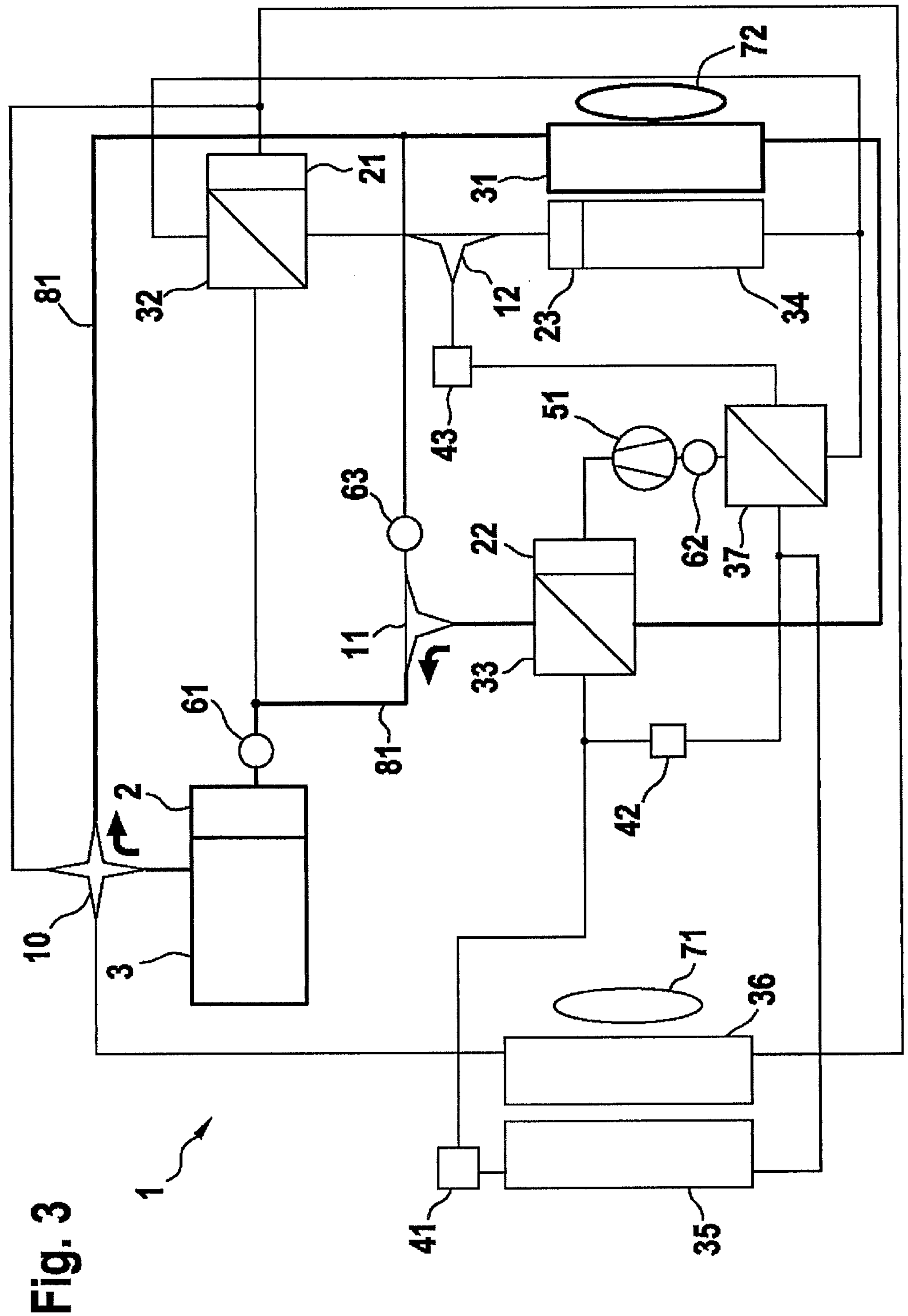
FIG. 3 schematically shows the structure of the air conditioning device having a marked valve position of the valves of the first fluid circuit according to another specific embodiment of the present invention.

FIG. 3 schematically shows the structure of air conditioning device 1 having a marked valve position of the valves of first fluid circuit 81 according to another specific embodiment of the present invention. FIG. 3 shows essentially the same components using the same reference numerals as FIG. 1; in addition, FIG. 2 shows that four-way valve 10 in its first position and first three-way valve 11 in its first position may, due to their valve positions used, form first fluid circuit 81, which may be used for heating the interior and/or the at least one component of the electric vehicle.

Figure 4:
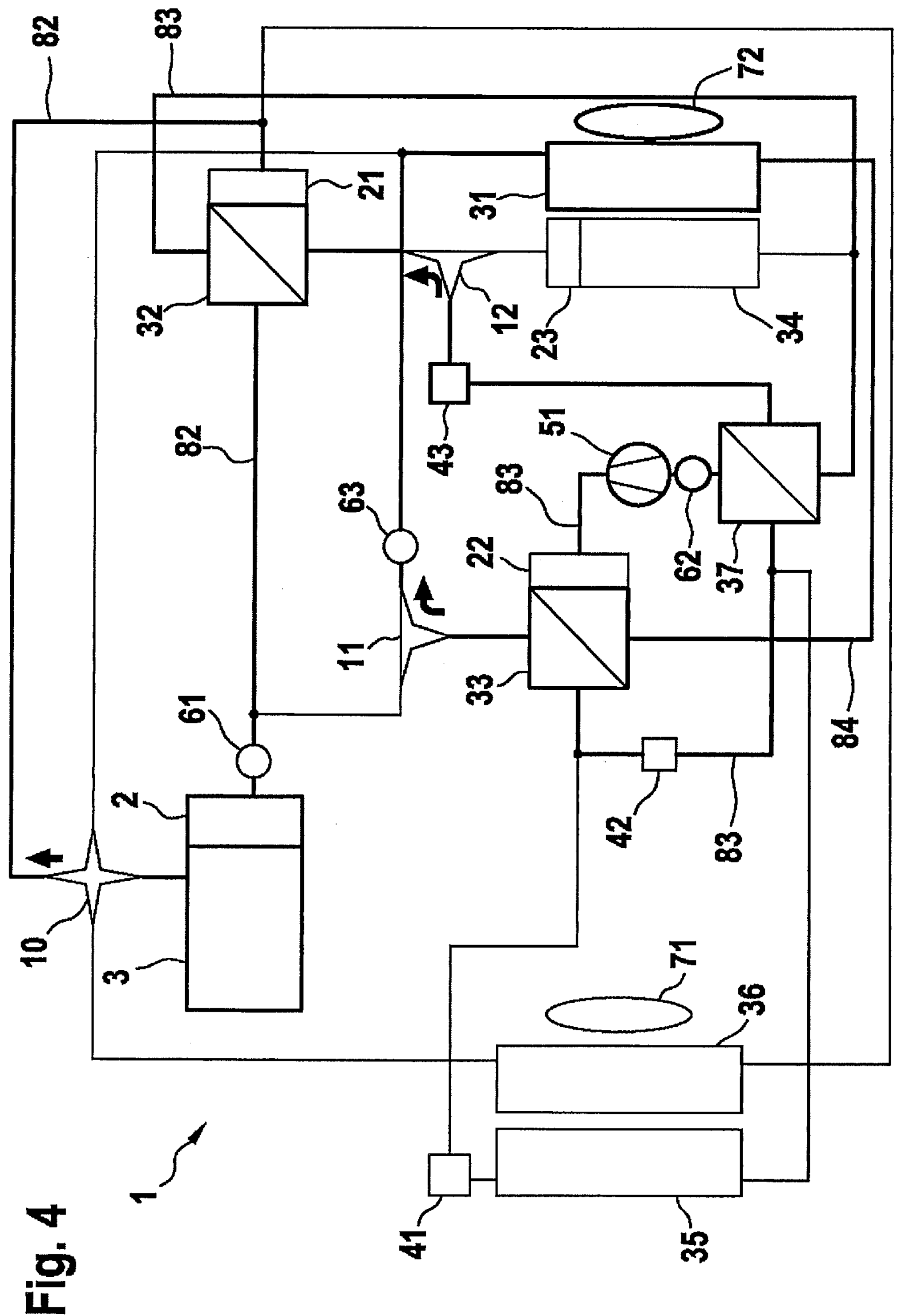
FIG. 4 schematically shows the structure of the air conditioning device having another marked valve position of the valves of the second, the third, and the fourth fluid circuits according to another specific embodiment of the present invention.

FIG. 4 schematically shows the structure of air conditioning device 1 having another marked valve position of the valves of the second, the third, and the fourth fluid circuits according to another specific embodiment of the present invention. FIG. 4 shows essentially the same components using the same reference numerals as FIG. 1; in addition, FIG. 2 shows: second three-way valve 12 connects, in a first position, third fluid circuit 83 to second fluid circuit 82 via second heat exchanger 32. Four-way valve 10, in a second position, forms second fluid circuit 82. First three-way valve 11, in a second position, forms fourth fluid circuit 84.

Figure 5:
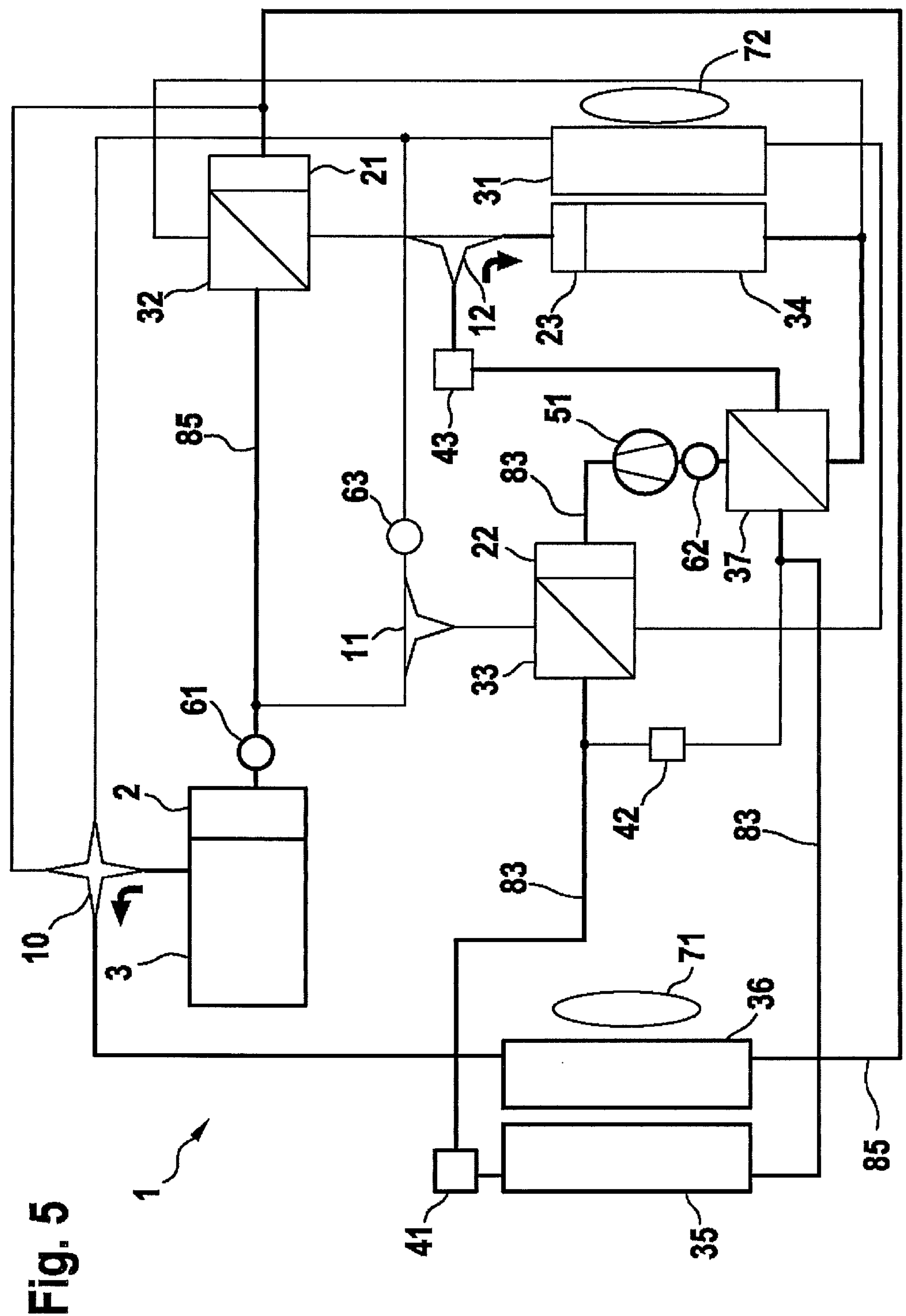
FIG. 5 schematically shows the structure of the air conditioning device having another marked valve position of the valves of the third and the fifth fluid circuits according to another specific embodiment of the present invention.

FIG. 5 schematically shows the structure of air conditioning device 1 having another marked valve position of the valves of the second, the third, and the fifth fluid circuits according to another specific embodiment of the present invention. FIG. 2 shows essentially the same components using the same reference numerals as FIG. 1; in addition, FIG. 2 shows: four-way valve 10, in its third position, forms fifth fluid circuit 85. Second three-way valve 12 connects, in a second position, third fluid circuit 83 to fourth heat exchanger 34, whereby cooling of the interior of the electric vehicle is made possible.

Although the present invention has been elucidated above with reference to preferred exemplary embodiments, it is not limited thereto, but may be carried out in other ways.

What is claimed is:

1. An air conditioning device for an electric vehicle, comprising:

multiple fluid circuits each having working media and configured for heating and cooling the electric vehicle;

wherein a first fluid circuit is configured to be selectively switched on to circulate working media from a first motor-driven pump, via a heat source, a four-way valve, and a first heat exchanger, and further via a third heat exchanger and a first three-way valve, back again to the first pump, and wherein the first fluid circuit is configured for heating the interior of the electric vehicle via the first heat exchanger;

wherein a second fluid circuit is configured to be selectively switched on to circulate working media from the first pump, via the heat source, the four-way valve, and a second heat exchanger having a first evaporator, back again to the first pump, and wherein the second fluid circuit is configured for heating the first evaporator;

wherein a third fluid circuit is configured to be selectively switched on to circulate working media from the first evaporator of the second heat exchanger, via an internal heat exchanger, a compressor, a second pump, a third heat exchanger having a second evaporator, and a spring-loaded check valve, and further via the internal heat exchanger, a first throttle, and a second three-way valve in a first position, back again to the second heat exchanger, and wherein the third fluid circuit is configured for heating the third heat exchanger;

wherein the third fluid circuit having the second three-way valve in a second position and having an open through valve includes (i) a fifth heat exchanger, and (ii) a fourth heat exchanger, and is configured for cooling the interior of the electric vehicle via the fourth heat exchanger, wherein the spring-loaded check valve is located downstream of the third heat exchanger, and wherein the second three way valve is located downstream of the first throttle and upstream of the second heat exchanger and the fourth heat exchanger;

wherein a fourth fluid circuit is configured to be selectively switched on to circulate working media from the third heat exchanger, via the first three-way valve and a third pump, to the first heat exchanger and back to the third heat exchanger, and wherein the fourth fluid circuit is configured for heating the interior of the electric vehicle via the first heat exchanger using a heat amount received from the third fluid circuit via the third heat exchanger; and wherein a fifth fluid circuit is configured to be selectively switched on to circulate working media from the first pump, via the heat source, the four-way valve, and a sixth heat exchanger, and further via the second heat exchanger, back again to the first pump, and wherein the fifth fluid circuit is configured for cooling the heat source of at least one component of the electric vehicle.

2. The air conditioning device as recited in claim 1, wherein the heat source includes a thermal mass of at least one of an electric motor, a power electronic system, and a traction battery of the electric vehicle.

3. The air conditioning device as recited in claim 1, wherein at least one of the first, second, third, and fourth fluid circuit (i) is configured as a coolant circuit having a coolant circulating in the circuit as the working medium, and (ii) has an associated pump provided for circulating the working medium.

4. The air conditioning device as recited in claim 1, wherein at least one of the second heat exchanger, the third heat exchanger, and the internal heat exchanger is configured as a cross-counterflow heat exchanger.

5. The air conditioning device as recited in claim 1, wherein at least one of the first, fourth, fifth, and sixth heat exchanger is configured as an active heat exchanger having an associated additional blower.

6. The air conditioning device as recited in claim 1, wherein the at least one component of the electric vehicle to be air-conditioned includes an electrical energy accumulator of the electric vehicle to be operated in a specified temperature range.

7. The air conditioning device as recited in claim 1, further comprising:

a second throttle instead of the second three way valve in the third fluid circuit for supplying the second heat exchanger and the fourth heat exchanger with working media having different operating pressures, whereby at least one of (i) simultaneous heating and dehumidifying of the interior of the electric vehicle is achieved, and (ii) simultaneous cooling and dehumidifying of the interior of the electric vehicle is achieved.

8. The air conditioning device as recited in claim 1, wherein a thermal mass of one of a vehicle body, a chassis, or an undercarriage of the electric vehicle is provided as the heat source for the air conditioning device.

9. A method for automatically controlling an air conditioning device including fluid circuits having working media circulating and transporting thermal energy for heating and for cooling at least one of an interior and at least one component of the electric vehicle, the method comprising;

selectively switching on a first fluid circuit to circulate working media from a first motor-driven pump, via a heat source, a four-way valve, and a first heat exchanger, and further via a third heat exchanger and a first three-way valve, back again to the first pump, and wherein the first fluid circuit is configured for heating the interior of the electric vehicle via the first heat exchanger;

selectively switching on a second fluid circuit to circulate working media from the first pump, via the heat source, the four-way valve, and a second heat exchanger having a first evaporator, back again to the first pump, and wherein the second fluid circuit is configured for heating the first evaporator;

selectively switching on a third fluid circuit to circulate working media from the first evaporator of the second heat exchanger, via an internal heat exchanger, a compressor, a second pump, a third heat exchanger having a second evaporator, and a spring-loaded check valve, and further via the internal heat exchanger, a first throttle, and a second three-way valve in a first position, back again to the second heat exchanger, and wherein the third fluid circuit is configured for heating the third heat exchanger;

wherein the third fluid circuit having the second three-way valve in a second position and having an open through valve includes (i) a fifth heat exchanger, and (ii) a fourth heat exchanger, and is configured for cooling the interior of the electric vehicle via the fourth heat exchanger, wherein the spring-loaded check valve is located downstream of the third heat exchanger, and wherein the second three way valve is located downstream of the first throttle and upstream of the second heat exchanger and the fourth heat exchanger;

selectively switching on a fourth fluid circuit to circulate working media from the third heat exchanger, via the first three-way valve and a third pump, to the first heat exchanger and back to the third heat exchanger, and wherein the fourth fluid circuit is configured for heating the interior of the electric vehicle via the first heat exchanger using a heat amount received from the third fluid circuit via the third heat exchanger; and selectively switching on a fifth fluid circuit to circulate working media from the first pump, via the heat source, the four-way valve, and a sixth heat exchanger, and further via the second heat exchanger, back again to the first pump, and wherein the fifth fluid circuit is configured for cooling the heat source of at least one component of the electric vehicle.

10. The method as recited in claim 9, wherein the third fluid circuit is operated as a coolant circuit using carbon dioxide.

* * * * *